United States Patent [19]

Bernard

[11] 4,258,066
[45] Mar. 24, 1981

[54] PROCESS FOR EXTRUDING AND FORMING PORTION CONTROLLED FROZEN FOOD

[75] Inventor: Vincent E. Bernard, Richardson, Tex.

[73] Assignee: The Jimmy Dean Meat Company, Inc., Dallas, Tex.

[21] Appl. No.: 970,367

[22] Filed: Dec. 18, 1978

Related U.S. Application Data

[60] Continuation of Ser. No. 832,200, Sep. 12, 1977, abandoned, which is a division of Ser. No. 610,301, Sep. 4, 1975, Pat. No. 4,124,339, which is a continuation-in-part of Ser. No. 526,146, Nov. 22, 1974.

[51] Int. Cl.³ .............................................. A01K 43/00
[52] U.S. Cl. .................................... 426/231; 426/513; 426/516; 426/646
[58] Field of Search ............... 426/480, 524, 513, 646, 426/514, 232, 515, 231, 516, 517, 518; 17/41, 46, 52; 264/28, 202, 148, 176 R, 149, 177 R; 425/146, 145, 465

[56] References Cited
U.S. PATENT DOCUMENTS

| | | | |
|---|---|---|---|
| 3,307,503 | 3/1967 | Elmer et al. | 426/516 |
| 3,357,049 | 12/1967 | Spindler | 425/146 |
| 3,436,927 | 4/1969 | Gruber | 426/518 |
| 3,461,680 | 8/1969 | Rische | 426/524 |
| 3,677,775 | 7/1972 | Vogel | 426/513 |
| 3,759,721 | 9/1973 | Hawley | 426/524 |
| 3,889,013 | 6/1975 | Moule | 426/515 |
| 4,060,998 | 12/1977 | Bernard | 426/515 |

Primary Examiner—Raymond N. Jones
Assistant Examiner—George C. Yeung

[57] ABSTRACT

The specification discloses a system and process for producing discrete chilled products having preselected weights from a semi-fluid mixture. The semi-fluid mixture is pumped along a distribution path to an extruding manifold which extrudes a plurality of parallel continuous lengths of the mixture. The continuous lengths are directed through a chilling station in a parallel relationship in order to chill and firm the lengths such that the lengths maintain their extruded cross-sectional configuration. A cutter periodically severs the continuous lengths at predetermined intervals to provide a plurality of discrete products having predetermined weights. The pumping rate, rate of travel through the freezer and periodic severing of the continuous lengths may be selectively varied in order to maintain any desired weight of the discrete products.

13 Claims, 24 Drawing Figures

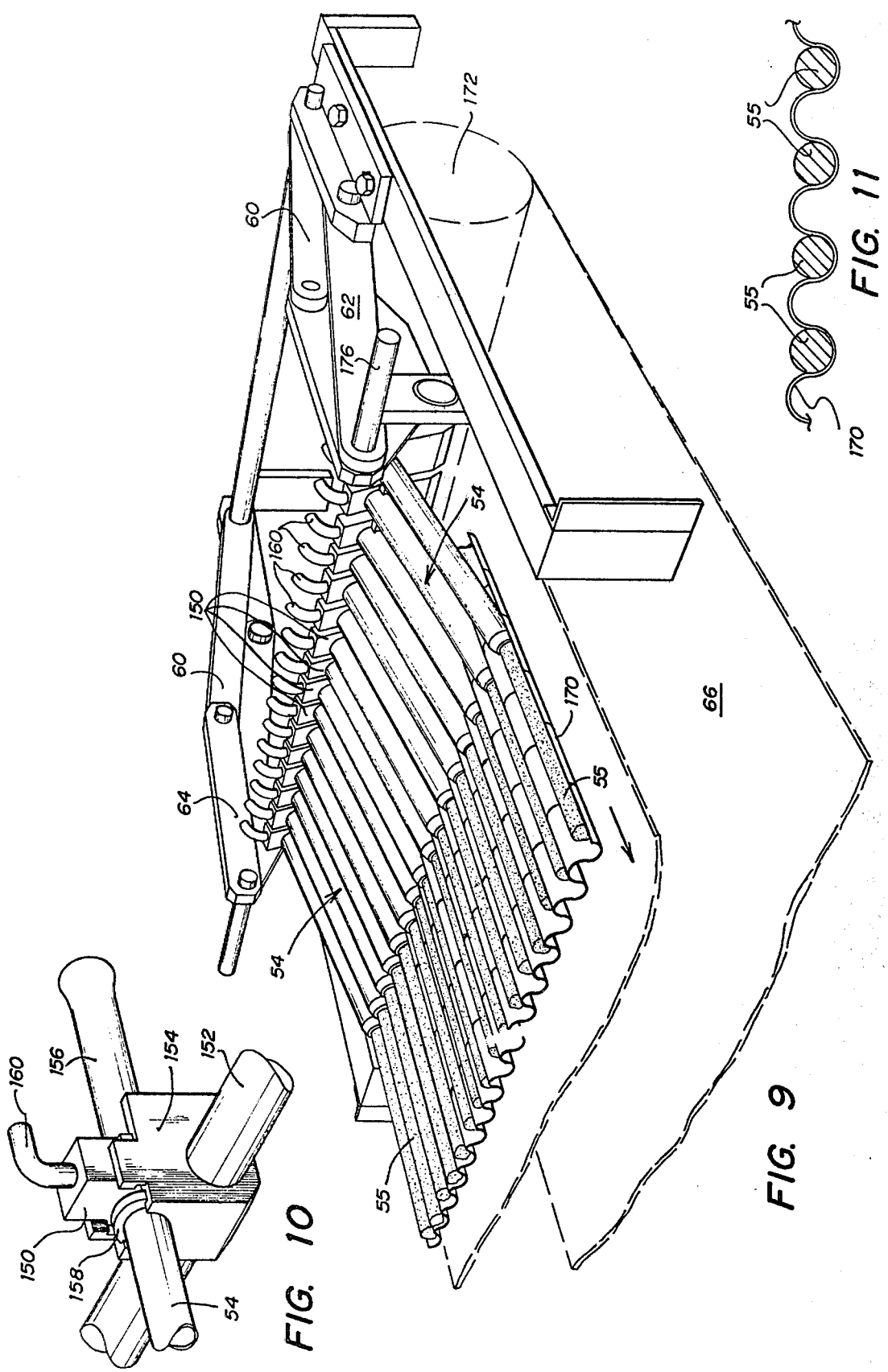

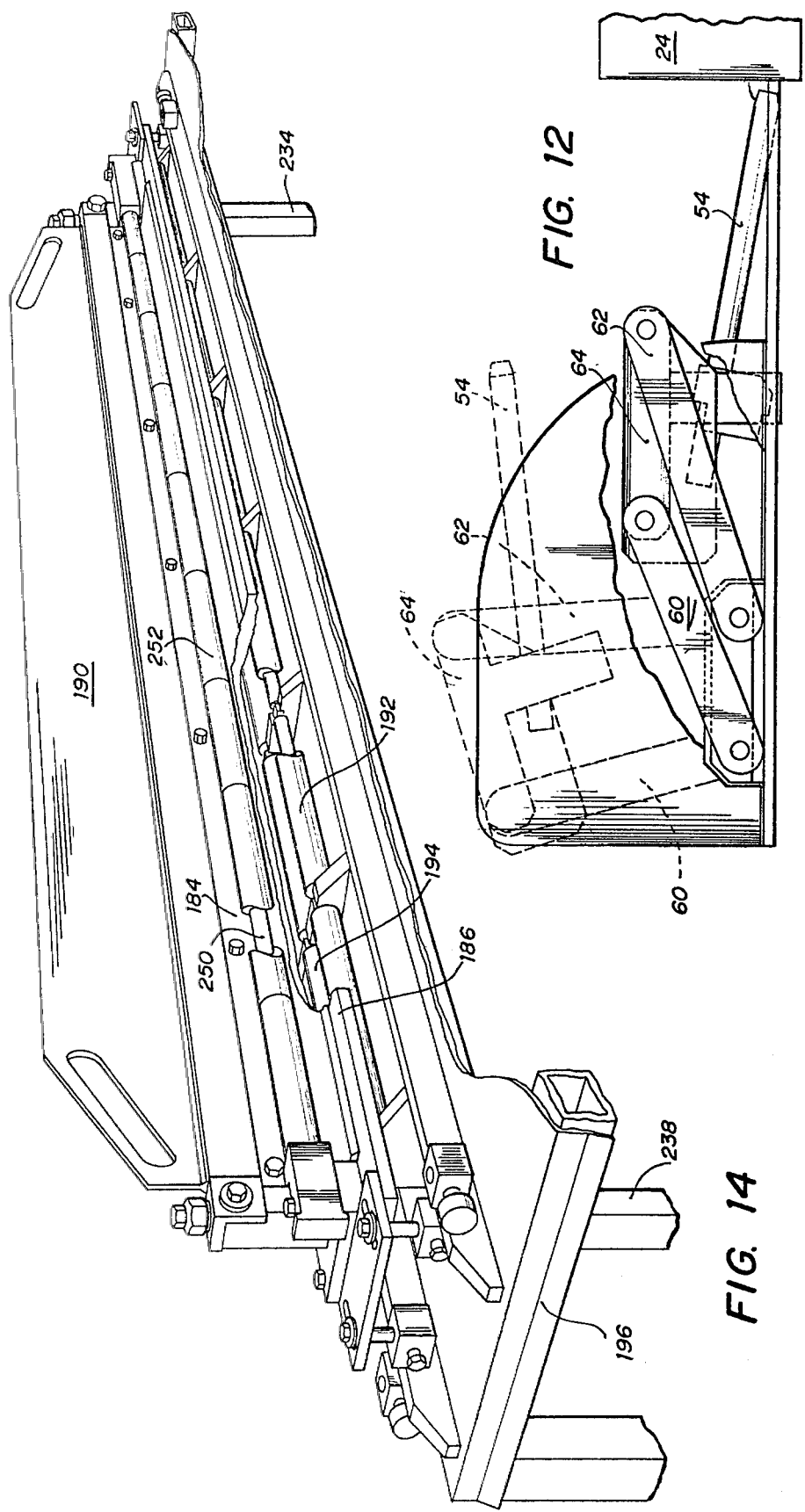

PROCESS FOR EXTRUDING AND FORMING PORTION CONTROLLED FROZEN FOOD

CROSS-REFERENCE TO RELATED APPLICATIONS

This is a continuation of Ser. No. 832,200, filed Sept. 12, 1977, now abandoned, which application is a division of Ser. No. 610,301, filed Sept. 4, 1975, now U.S. Pat. No. 4,124,339, and which is a continuation-in-part application of Ser. No. 526,146, filed Nov. 22, 1974 by the present Applicant and entitled "PORTION CONTROLLED FROZEN FOOD", now abandoned.

FIELD OF THE INVENTION

This invention relates to the preparation of discrete frozen products, and more particularly relates to a method for producing frozen foods in individual discrete portions.

DESCRIPTION OF THE PRIOR ART

A wide variety of products, such as explosives, rubber devices, food products and building materials are commonly formed from a semi-fluid material. When the semi-fluid material is not sufficiently rigid to maintain its shape after extrusion, it has been heretofore quite difficult to form discrete products having a predetermined shape and having a desired weight. It has thus been common to prepare discrete products from semi-fluid material by filling individual containers or molds and then freezing or otherwise treating the individual containers. Such processes requiring the filling of individual containers have been found to be relatively slow and expensive.

With respect to food products, it has become desirable in the home, restaurants and other places to utilize food portioned in predetermined serving sizes or portions. For example, it has become desirable to provide serving portions of sausage such as a one-ounce sausage link or a two-ounce sausage patty. However, it has not heretofore been practical to provide such close controlled portion sizes of foods such as skinless pork sausage with conventional packaging techniques.

It has heretofore been known to produce skinless sausage of various types by stuffing comminuted meat into a casing, setting the meat by chilling or cooking and then stripping the casing from the meat. The requirement of stuffing the casing and then stripping the casing is time consuming and of course wasteful. It has also reportedly been heretofore attempted to extrude pork for various processing techniques, but the resulting friction along the sides of the extruding tube have caused fat to come to the surface of the pork, thereby producing a product which appears to consist of all fat or excessive fat, and it is therefore unpleasing to the consumer.

A need has thus developed for a system and process to enable the continuous forming of a plurality of discrete solid products from semi-fluid material. The system and process must not only be fast and cost effective, but must enable the formation of a plurality of different shapes and sizes of discrete products with very close weight tolerances.

SUMMARY OF THE INVENTION

The present invention has reduced or eliminated the problems associated with the prior art previously described. In accordance with the present invention, a plurality of discrete products having a predetermined weight may be formed by a system which pumps a semi-fluid mixture along a distribution path. An extruding manifold receives the semi-fluid mixture and extrudes the mixture at a selected rate to form a plurality of parallel continuous lengths of mixture having predetermined uniform cross-sections. A conveyor directs the continuous lengths through a chilling station in a parallel relationship in order to chill and firm the lengths such that the lengths maintain their extruded cross-sectional configuration. Structure periodically severs the continuous lengths at predetermined intervals to provide a plurality of discrete products having predetermined weights.

In accordance with another aspect of the invention, a system is provided for forming a plurality of discrete products having preselected weights which includes a hopper for receiving a quantity of warm semi-fluid material. A pump pumps the material through a feed line at a selected rate and pressure. An extruder manifold has an inlet connected at the end of the feed line and includes a plurality of outlets with smaller dimensions than the inlet. A plurality of flexible conduits extend from the manifold outlets and include end nozzles to form a plurality of continuous extruded lengths of material. Metering pumps are mounted in series with each of the flexible conduits to meter the flow of the material therethrough. A chilling chamber is mounted adjacent the end nozzle. A conveyor receives the continuous lengths from the end nozzles and carries the continuous lengths through the chilling chamber to chill and firm the continuous lengths. A cutting blade is mounted at the outlet of the chilling chamber and is movable in synchronism with the conveyor for severing the continuous lengths to form a plurality of discrete products having the selected weight.

In accordance with a more specific aspect of the invention, a cutting system is provided to periodically sever a plurality of continuous lengths of material and includes structure for receiving a plurality of parallel lengths of material traveling in a direction parallel to the axes of the lengths. An elongated cutting blade is disposed above and normal to the direction of travel of the lengths of material. Structure moves the blade downwardly for simultaneously severing all of the lengths of material while moving the blade in the direction of travel of the lengths of material and at the same rate of speed as the lengths of material.

In accordance with another aspect of the invention, an extruder is provided which includes a pump for pumping semi-fluid material. A bladder is disposed in the outlet of the pump to sense the pressure of the semi-fluid material. A bellows is connected to the bladder. Fluid fills the bladder and the bellows. Circuitry is provided for generating an electrical signal in response to movement of the bellows. Circuitry is responsive to the electrical signals for varying the speed of the pump in order to maintain a constant flow rate and pressure of material.

In accordance with yet another aspect of the invention, a process of producing discrete products having a selected weight includes forming a semi-fluid mixture of the product. The mixture is pumped to an extrusion station, whereupon the mixture is extruded into an elongated continuous length having a predetermined uniform cross-section. The continuous length is directed through a chilling station while maintaining the predetermined uniform cross-section to chill and firm the predetermined cross-sectional shape of the lengths. The lengths are then divided at periodic intervals to form a plurality of products having the same selected weight.

In accordance with yet another aspect of the invention, a process for producing pork sausage includes boning warm prerigor pork. The boned pork is then comminuted to form a semifluid mixture which is pumped to an extrusion location. The semi-fluid mixture is then extruded into a plurality of parallel continuous lengths having uniform cross-sections. The extruded continuous lengths are chilled such that the lengths maintain the desired cross-sectional configuration. The lengths are then periodically severed to form a plurality of chilled discrete sausage portions having the same weight and consistency.

DESCRIPTION OF THE DRAWINGS

For a more detailed description of the present invention and for further objects and advantages thereof, reference is now made to the following description, taken in conjunction with the accompanying drawings, in which:

FIG. 1 is a block diagram of the present portion controlled forming system;

FIG. 2 is a perspective view of the extruding portion of the system;

FIG. 9 is a perspective, partially broken away view of the extrusion nozzle assembly of the invention;

FIG. 10 is a perspective enlarged view of the nozzle connections assembly;

FIG. 11 is a sectional view of the corrugated forms shown in FIG. 9 with continuous sausage lengths disposed therein;

FIG. 12 is a side view of the parallelogram lift linkage for the nozzle assembly;

FIG. 14 is a perspective, partially broken away rear view of the cutting mechanism shown in FIG. 13;

DESCRIPTION OF THE PREFERRED EMBODIMENT

Figure 3:
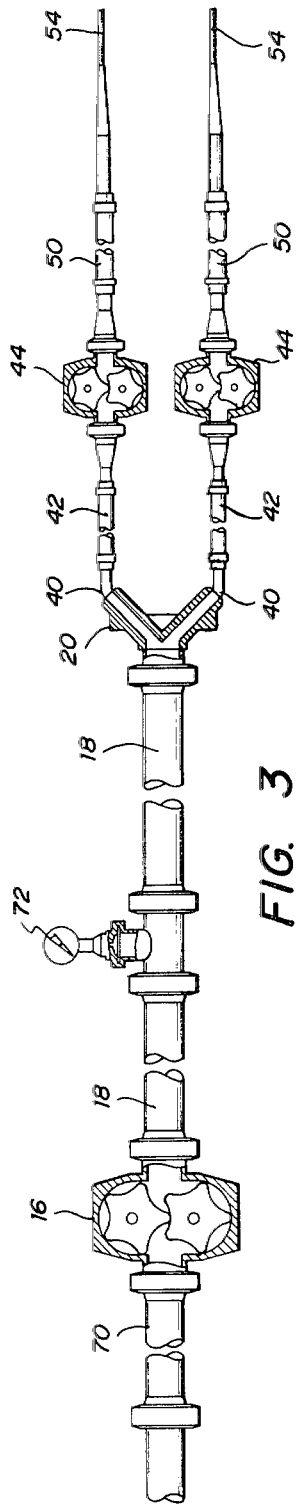
FIG. 3 is a partially broken away view of the extrusion portion of the system illustrating the pumping and metering portions of the system.

FIG. 1 is a top flow plan illustrating the use of the present product forming invention to make fresh pork sausage. It has been found that the present invention is particularly adaptable to making fresh pork sausage and a detailed description of the invention will be made with respect to production of pork sausage from warm semi-fluid pre-rigor pork. However, it will be apparent that the present invention may also be utilized to form discrete products from other semi-fluid materials. For the purposes of this invention, the term semi-fluid is defined as material which is pumpable through conduits. The present system may thus be utilized to extrude hot or chilled and ground meat, or other types of pumpable material.

Referring to FIG. 1, freshly killed hogs are dressed, skinned and cut shortly after slaughter. The still warm pre-rigor pork is cut on a boning table 10 and all cuts including the ham, loins and the like of the hogs are utilized in making the sausage. The hot boned meat coming off the boning table 10 is fed into a grinder 12 and is checked for fat content to maintain the fat content at 35%. A fat analysis unit, not shown, is maintained near the grinder 12 in order to make rapid fat checks regarding the fat content of the sausage being ground. The output of the grinder 12 is applied to two blenders 14a and 14b which form the sausage into a semi-fluid fluent material which will not retain its shape after being extruded. In the preferred embodiment of the invention, it is necessary that the hogs be boned and ground within about four hours from slaughter before rigor mortis, and the temperature of the boned meat be maintained at as near body temperature as possible, and at any rate above 80° F., such that the rended pork output from the blenders 14a and 14b is semi-fluid so as to freely flow. The process should be carried out in a room having an ambient temperature of not under 50° F. In the preferred embodiment, it is preferable to bone, grind, chill and sever the pork sausage within 90 minutes after slaughter. Alternatively, the present system may utilize chilled raw material which becomes semi-fluid after blending in the blenders 14a and 14b.

In the preferred embodiment, the blenders 14a and 14b may comprise, for example, two 3,000 pound Rietz blenders. The semi-fluid material output from the blenders is applied through a pump 16, which may comprise for example an auger feed pump including a de-aerating head. Pump 16 applies semi-fluid pork sausage through a distribution line 18 at a predetermined flow rate to an extruder manifold 20. Although only a single manifold 20 is illustrated, it will be understood that two or more manifolds may be utilized, depending upon the desired quantity of material to be handled. The manifold 20 extrudes a plurality of continuous lengths of semi-fluid material which are applied through flexible conduits 22.

The flexible conduits 22 include nozzles on the ends thereof to form and extrude continuous lengths of pork sausage having predetermined uniform cross-sections, the continuous lengths being moved in parallel through a freezer 24. While it will be understood that the number of continuous lengths produced by the system may be varied, depending on the desired system output and the width of the freezer, in the preferred embodiment, sixteen continuous lengths of material are extruded from the extruder manifold 20. The continuous lengths move at 15-feet per minute through the freezer 24, whereupon the continuous lengths are quickly chilled to an extent that they maintain their extruded cross-sectional shape. The freezer 24 may comprise any suitable type of freezer, but in the preferred embodiment comprises a liquid nitrogen freezer such as the Cyro-Quick freezer manufactured and sold by Air Products Corporation. In some cases, it may be desirable to spray a refrigerant such as nitrogen or fluorocarbon upon the sausage or on the underside of the moving conveyor belt in order to quickly chill the sausage.

The chilled pork sausage exits the freezer 24 at an internal temperature of $-10°$ F. The chilled sausage is periodically severed into desired lengths by a cutter 26 to form a plurality of discrete sausage products each having a predetermined weight and volume. For example, sausage lengths may be cut having a length of $3\frac{3}{4}$ inches and having a weight of one-ounce. Sausage patties may be produced by the system having a weight of from $1\frac{1}{2}$ to 5-ounces. If desired, the present device may be utilized to produce square sausage patties having a width of $2\frac{1}{2}$ inches and a weight of $1\frac{1}{2}$ ounces. An important aspect of the present invention is that a very high degree of portion control may be achieved by the present system to provide products of uniform size, shape and weight. The emulsion density, emulsion flow speed, freezer belt speed and cutoff blade operation may be varied in order to maintain the exact desired weight, or to change to a different desired weight or size. If desired, the speed of emulsion flow in one of the extruder conduits may be varied in order to produce one lane of heavier lengths which may then be used to increase the weight of light sausage packages.

The severed sausages formed by the cutter 26 are applied to a loader 28 which accumulates predetermined numbers of sausages and applies them to a fill and seal station 30. The station 30 fills cartons with predetermined numbers of frozen sausages and seals the cartons. The cartons are then directed to a weighing station 32 and then to a metal detector station 34. A plurality of cartons are loaded into cases at stations 36 and the cases are then sealed for transport.

The present hot molding process, in combination with the present extrusion system, enables the production of packages of frozen pork lengths or sausage patties within 70 to 90 minutes after live hogs enter the restrainer in the slaughtering department. The present system can thus produce over 3,000 pounds an hour of sausage in a nonstop process which requires only a few workers for maintaining operation of the machines. With the addition of additional extruders, greater yields may, of course, be provided.

The present process is extremely economical, in that no storage space is necessary, as the sausages may be packaged and loaded onto a truck within several hours of the time the hogs are slaughtered. The present system is extremely accurate in the control of portions, as sixteen one-ounce lengths may be packaged to a package to provide a very close tolerance to a one-pound meat package. The present system provides very low waste, as there is no discard of bits and pieces, which occurs with prior techniques. The present system provides an increased yield, as the meat is not continuously handled after slaughter, thereby eliminating loss from chilling, cutting or other handling steps. The present technique does not require casing or skin, and thereby eliminates steps of stuffing sausage in the casing and removal of the casing. The present system is extremely sanitary, and bacteria and mold growth is reduced due to the fact that sausage is not necessarily held in a chilling room or the like after slaughter.

FIG. 2 illustrates the extrusion system of the invention. The semi-fluid sausage material is applied from the pump 16, not shown, through the distribution conduit 18 to the extrusion manifold 20. The extrusion manifold has a generally conical configuration, with the distribution conduit communicating with the apex of the manifold cone. A plurality of outlets 40 are provided about the periphery of the base of the cone of the manifold 20. In the preferred embodiment, sixteen outlets 40 are provided. The lower ones of the outlets 40 are made slightly smaller than the upper outlets 40 to maintain even pressure and flow rate of material from all the outlets. Sixteen flexible conduits 42, which may comprise for example flexible clear plastic hoses, are attached to the outlets 40. The ends of the conduits 42 are connected to the inlets of metering pumps 44 which are commonly driven in order to maintain the flow rate in each of the conduits 42 at the same level. Of course, if desired, one or more of the pumps 44 can be driven at a different rate.

Eight metering pumps 44 are illustrated in FIG. 2 as being mounted upon a support bracket 46. Eight metering pumps, not shown, are mounted on the rear side of the support bracket 48. Sixteen flexible conduits or hoses 50 are connected to the outputs of the metering pumps 44 and extend to a nozzle support housing 52. Sixteen extrusion nozzles 54 are rigidly mounted in the support housing 52 and communicate with the ends of the hoses 50. The nozzles 54 are formed from stainless steel or other acceptable materials and are configured to provide the desired uniform cross-section of the discrete products to be extruded. The continuous lengths of extruded sausage are identified generally as 55 and are shown moving from the ends of the nozzles 54 into the freezer 24. In FIG. 2, the nozzles 54 are illustrated as having circular cross-sections, but it will be understood that square or other cross-sections may also be provided to the nozzles 54. It may be seen in FIG. 2 that the flexible hoses 42 and 50 bend in order to accommodate connections between the metering pumps 44 which are at varying heights and the nozzles 54 which are supported in parallel on a horizontal plane.

The extruder manifold 20 is supported by a support 56. A base 58 supports the support 56 and the support brackets 46 and 48. Base 58 includes the drive motor for the metering pumps 44. The nozzle support housing 52 is mounted on a parallelogram linkage including arms 60 and 62 which are pivotally joined by the horizontal bar 64. The parallelogram linkage may be moved from the illustrated lower position to an upper position, to be subsequently described, in order to move the nozzles 54 into and out of contact with the freezer conveyor. The freezer conveyor 66 comprises a metal mesh conveyor which conveys the extruded semi-fluid material into the nitrogen freezer 24.

FIG. 3 illustrates in greater detail the pump of the present extruder. Semi-fluid material is applied through a conduit 70 from the blenders 14a and 14b (FIG. 1) to the pump 16. Pump 16 may comprise any suitable type of pump, such as a Crepaco auger feed pump with a de-aerating head, which may be operated to force the semi-fluid material through the distribution line 18 at a prescribed flow rate. A pressure gauge 72 communicates with distribution line 18 in order to enable the pump 16 to be manually adjusted to maintain the desired pressure and flow rate. Semi-fluid material flows through the distribution lines 18 to the extruder manifold 20 in the manner previously described.

In FIG. 3, only two of the outlets 40 are illustrated for clarity of illustration. Outlets 40 are smaller in diameter than the inlet to the manifold 20. The outlets 40 are connected to the flexible tubes or conduits 42 which lead to the metering pumps 44. Pump 16, the distribution line 18, the extruder manifold and the pump 44 are preferably comprised of stainless steel for cleanliness of operation. The metering pumps 44 are commonly driven from a D.C. motor. The metering pumps operate to provide equal pressure, flow rate speed and consistency of semi-fluid material in each of the extruder nozzles. The head pressure applied to the metering pumps 44 is greater than the output from the pumps in order to enable constant extrusion and to enable control of the density and weight of the resulting emulsion extruded. For example, the head pressure applied to each pump 44 may be 40 psi, with the output pressure from each pump being 10 psi. The nozzles 54 are particularly designed to provide even extrusion distribution and to prevent uneven density throughout the extruding product.

Figure 4:
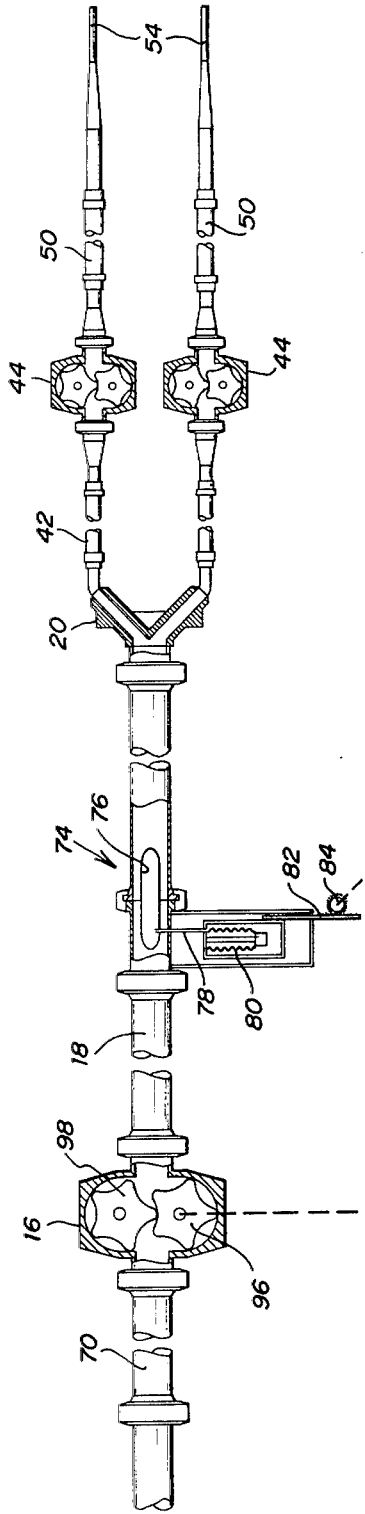
FIG. 4 is a partially broken away diagram of the extrusion system of yet another embodiment of the extrusion system of the invention including an automatic flow rate control circuit.

FIG. 4 illustrates a system for automatically varying the pump 16 to maintain the desired pressure and flow rate of the material being extruded. The system shown in FIG. 4 is identical to that shown in FIG. 3, with like numerals being utilized for like and corresponding parts, with the exception of the automatic pressure monitoring system 74 which replaces the pressure gauge 72. The automatic pressure sensing system 74 comprises a rubber bladder 76 which is positioned in the middle of the distribution line 18 and is streamlined so as not to obstruct the flow of semi-fluid material therethrough.

Bladder 76 is filled with edible fluid. A tube 78 communicates between the bladder 76 and a bellows 80. A rack gear 82 is associated to be moved in response to movement of the bellows 80. A pinion gear 84 is rotated in response to movement of the rack gear 82. Pinion gear 84 causes rotation of a potentiometer 86 which generates electrical signals responsive to the amount of movement of gear 84, and applies the signals to an operational amplifier 88. Amplifier 88 receives a reference voltage and includes suitable interfacing for matching with the D.C. motor control circuitry 90. Motor control 90 generates a D.C. drive singal for the D.C. motor 92 which operates gears 94 which rotate vanes 96 and 98 of pump 16.

In this manner, as the pressure sensed by the bladder 76 changes, the position of the bellows 80 varies, thereby moving the rack gear 82. This movement is detected by the pinion gear 84 which operates potentiometer 86 to change the electrical signal applied to the operational amp 88. Amplifier 88 varies the D.C. motor control 90 in order to change the speed of the D.C. motor 92 in order to vary the speed of operation of the pump 16 to maintain the desired pressure and flow rate of material passing through the distribution line 18. The desired pressure may be varied by varying the reference voltage applied to the operational amplifier 88.

Figure 6:
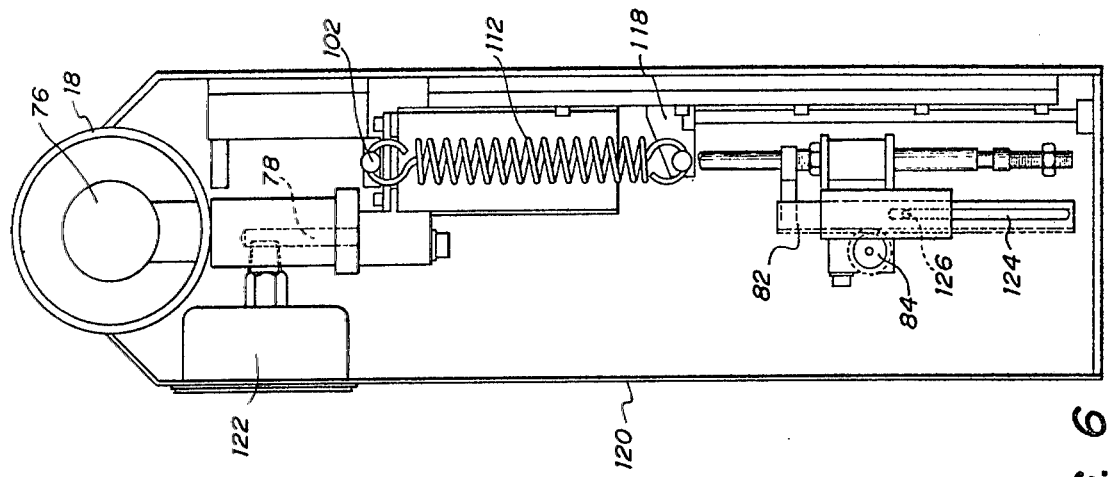
FIG. 6 is a partially sectioned rear view of the flow rate control system shown in FIG. 5.
Figure 5:
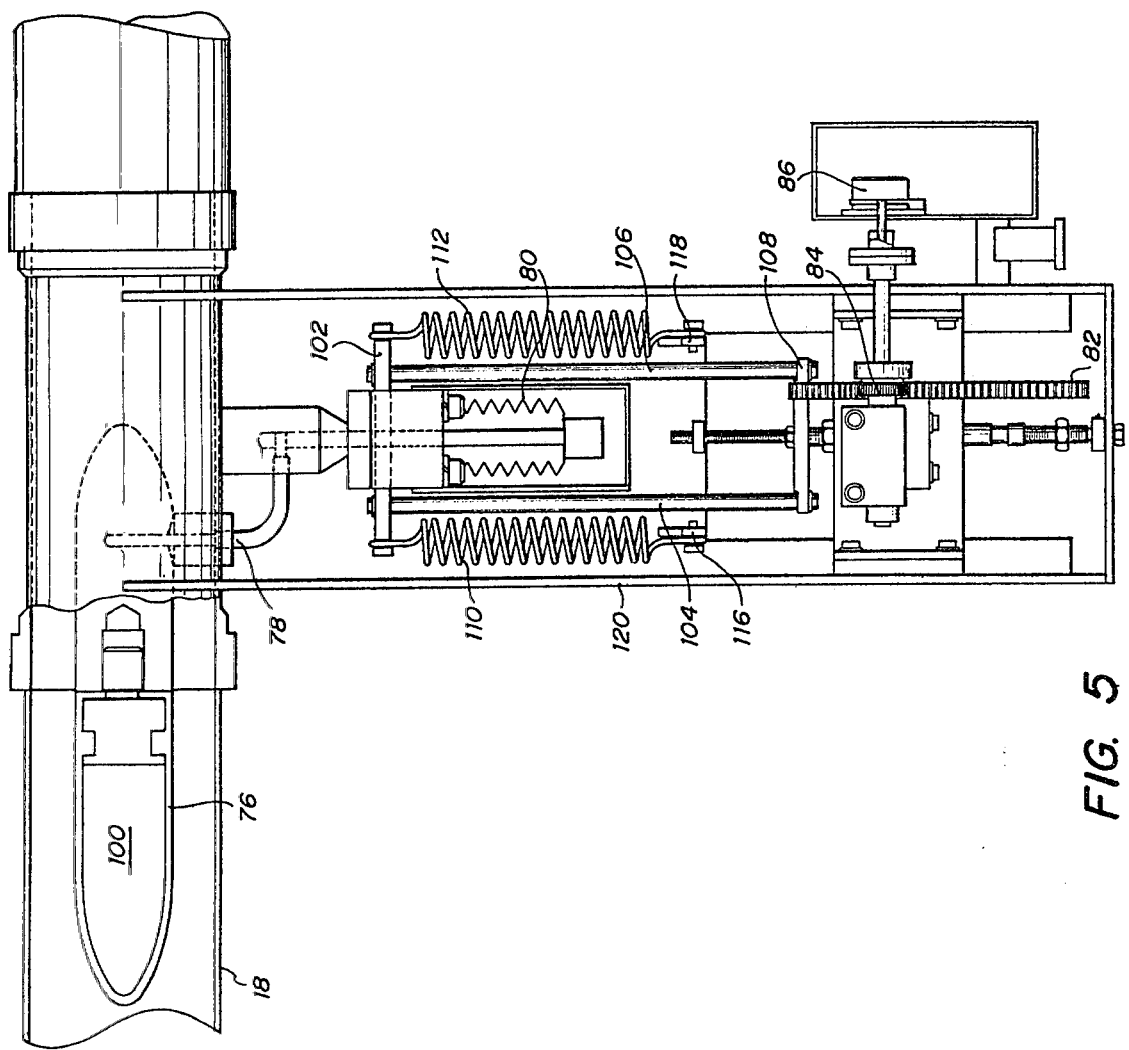
FIG. 5 is a partially sectioned side elevational view of the flow rate control system shown in FIG. 4.

FIGS. 5 and 6 illustrate the pressure sensor of the present invention in greater detail. FIG. 5 illustrates a partial cross-section of the rubber bladder 76 which is filled with edible oil 100. In case of a puncture of the bladder 76, the edible oil 100 will leak into the sausage but will not damage the sausage. The conduit 78 leads from the bladder 76 downwardly to the bellows 80. A top plate 102 is connected to the top of the bellows 80 and is also connected to rods 104 and 106 which are connected to a lower plate 108. Plate 108 is connected to the rack gear 82 which causes rotation of the pinion gear 84 in the manner previously described. Springs 110 and 112 are connected between the top plate 102 and upwardly standing ears 116 and 118 which are rigidly connected to the outer housing 120. Springs 110 and 112 operate to bias the bellows 80 back to a normal position after expansion. The rotation of the pinion gear 84 causes adjustment of the potentiometer 86 which causes the generation of the electrical signals in the manner previously described.

FIG. 6 is a side view of the pressure sensing device, illustrating how the bladder 76 is centrally disposed within the distribution line 18. A pressure gauge 122 is mounted in housing 120 and is connected to the conduit 78 to provide a visual indication of the pressure within the distribution line 18. FIG. 6 illustrates the connection of spring 112 between the upper plate 102 and ear 118. FIG. 6 also illustrates the side view of the rack gear 82, illustrating a slot 124 which receives a pin 126 to maintain the rack gear 82 in a vertical orientation. The pinion gear 84 is illustrated in meshing engagement with the rack gear 82. The pressure gauge thus provides automatic control of the pressure and flow rate of the material through the distribution line 18, in order to insure that the final extruded product will have the desired weight, consistency and volume.

Figure 7:
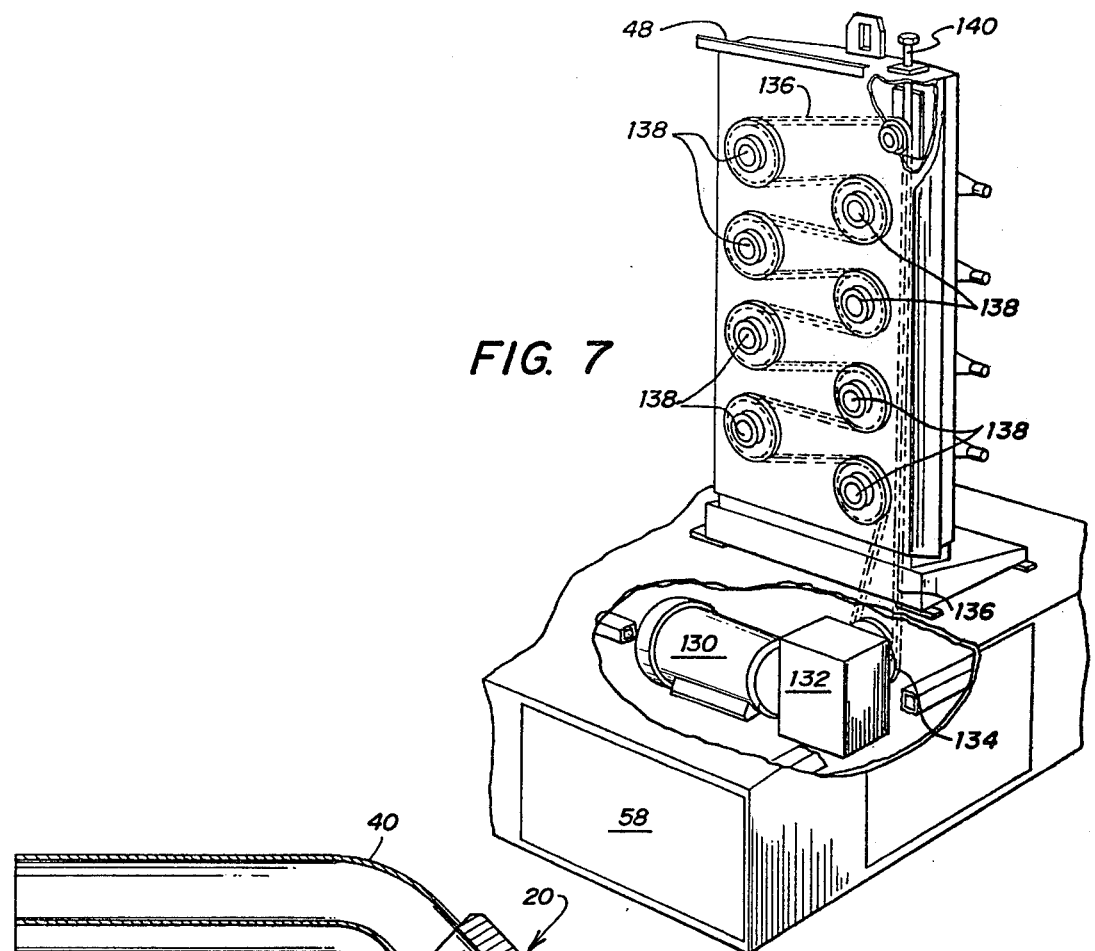
FIG. 7 is a perspective partially broken away view of the metering system of the present extruder.

FIG. 7 illustrates one-half of the metering pump station shown in FIG. 2. Base 58 is shown partially broken away in order to illustrate an electrical drive motor 130 which operates a gear box 132 to drive an output gear 134. A belt or chain 136 is interleaved between a plurality of pulleys 138 which operate to rotate the vane metering pumps 44. Eight of the metering pumps 44 shown in FIG. 2 are removed for clarity of illustration in FIG. 7. The remaining eight metering pumps are mounted on the opposite side of support bracket 48. A screw 140 may be adjusted in order to adjust the tension of the belt or chain 136. With the use of the arrangement shown in FIG. 7, common drive is provided to each of the metering pumps 44 in order to insure that the sausage flowing through the conduits 50 is provided with the same flow rate and pressure. This insures uniform consistency of the sausage product, as well as insures that the final weight of each discrete product will be the same.

Figure 8:
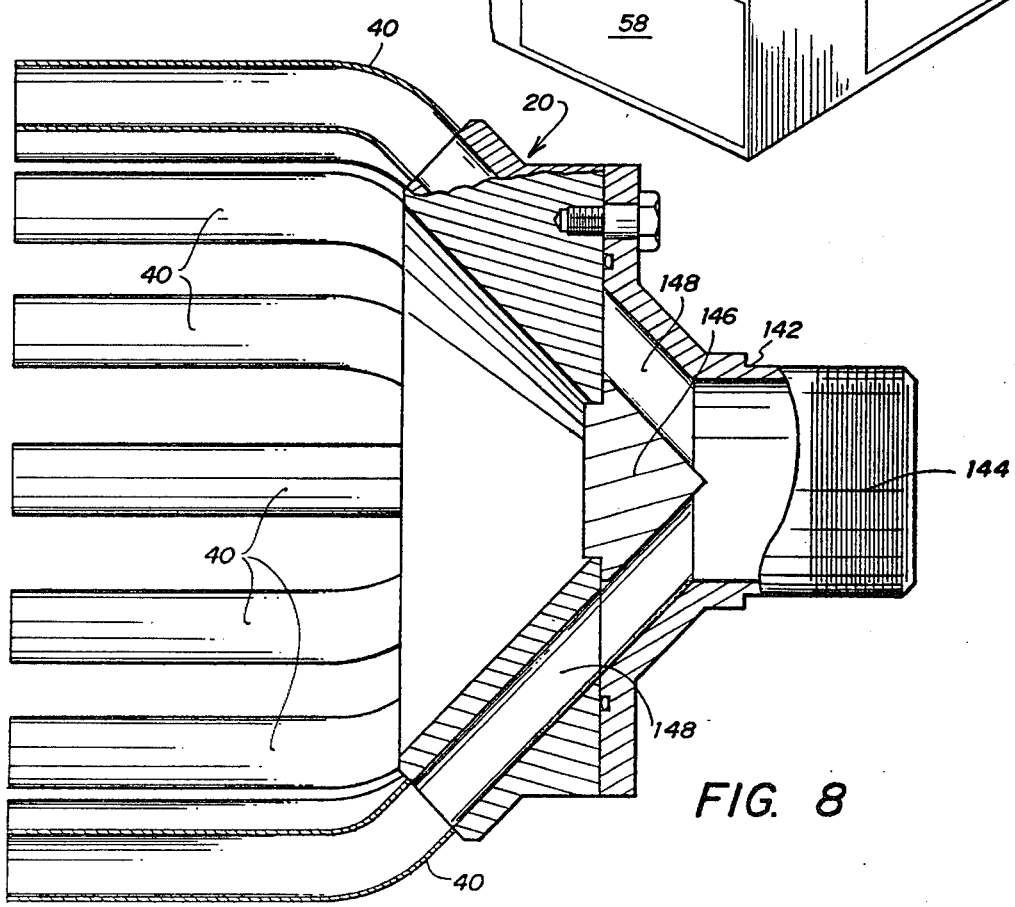
FIG. 8 is a sectional view of the extrusion manifold of the invention.

FIG. 8 is a sectional view taken through the extruder manifold 20 previously shown in FIG. 2. Manifold 20 is provided with a generally conical cross-sectional configuration, with an inlet 142 connected at the apex of the cone. The inlet 142 includes threads 144 for threadedly receiving the distribution line 18. Sixteen outlets 40 are connected about the periphery of the base of the manifold cone in a symmetrical arrangement. The lower ones of the outlets 40 are provided with a slightly smaller diameter than the upper ones of the outlets 40, in order to insure that the pressure of the material flowing through each of the outlets is the same. A conical member 146 is mounted in the center of the extruder manifold, with the apex of the conical member 146 being directed toward the center of the inlet 142. An extrusion area 148 is thus formed between the outer walls of the manifold 20 and the conical member 146 in order to deliver the extruded material to the outlets 40 for extrusion. As previously noted, the outlets 40 are connected to flexible conduits or hoses 42 which direct the semi-fluid material to metering pumps 44, shown in FIG. 2.

FIG. 9 illustrates the extrusion nozzles 54 which form a plurality of parallel continuous lengths of semi-fluid material which are delivered into the freezer 24. Hoses 50 have been eliminated from FIG. 9 for clarity of illustration. Referring to FIG. 9, it will be seen that the nozzles 54 are aligned in a parallel configuration and slant downwardly toward the metal mesh, endless conveyor belt 66 which travels into the freezer 24. Each of the nozzles 54 is frictionally mounted in a block 150, and all of the blocks 150 are aligned along a rod 152 to form the previously described nozzle support housing 52.

FIG. 10 illustrates in greater detail the interconnection of each of the nozzles 54. Rod 152 extends horizontally across the conveyor belt 66 and is attached at opposite ends to the parallel linkages comprising arms 60, 62 and bar 64 previously described. A plurality of housings 154 are rigidly mounted along the rod 152.

Each of the housings 154 includes a cutout portion for snugly receiving the bottom of one of the nozzles 54. Each of the nozzles 54 includes a rearwardly extending portion 156 for connection to one of the flexible hoses 50. The nozzle 54 also includes an enlarged diameter portion 158 for abutting with the front edge of the housing 154. The block 150 is adapted to frictionally engage with the top of the housing 154. A curved metal extension 160 extends upwardly from the block 150 in order to be tapped by a mallet or hammer in order to drive the block 150 into frictional engagement with the upper portion of the housing 154. In this manner, the nozzles may be securely attached for operation. When it is desired to clean the system, the block 150 is merely tapped out by a mallet, whereupon the nozzles 54 may be removed for cleaning. All of the elements shown in FIG. 10 are made of stainless steel to facilitate cleaning.

As shown in FIG. 9, in operation of the invention, sixteen continuous sausage lengths 55 of semi-fluid material are extruded from the nozzles 54. When the link sausage is being extruded with a circular cross-section, the semi-fluid material may not be able to retain the desired circular shape for a long enough period in order to be chilled. In such a case, stainless steel metal guide members 170 may be attached to the conveyor 66 in order to guide the continuous sausage lengths 55 into the freezer while maintaining the desired circular configuration. Guide member 170 is not required when square cross-section sausage patties are being extruded. The guide members 170, as shown in more detail in FIG. 11, are formed from corrugated stainless steel to receive the lengths 55, and are attached in short two or three inch length sections along the length of the conveyor belt 66. The guide members are short in order to enable the conveyor belt to bend about the drive pulley 172 during operation.

Referring to FIG. 9, the conveyor belt 66 is moving at the same speed as the continuous lengths 55 are being extruded, or in the preferred embodiment, at approximately 15 feet per minute. Similarly, the corrugated guide members 170 are being moved at the same speed as the conveyor belt 66. The extruding continuous lengths 55 are promptly moved by the conveyor belt 66 into the nitrogen freezer 24 (FIG. 1) whereupon the continuous lengths are immediately chilled to an extent that they maintain their cross-sectional shape. The present process is carried out in a room having an ambient room temperature of approximately 50° F. The freezer is provided with a temperature of approximately −170° F. in order to chill the interior of the continuous lengths 55 to approximately −10° F. Nitrogen or fluorocarbon liquid may be sprayed on the sausage or underneath the conveyor belt in order to quickly chill the sausage.

When the present system is initially turned on for operation, the continuous lengths 55 initially extruded may not be of the desired consistency or at the desired flow rate. Thus, a handle 176 is provided on the parallelogram linkage comprised of arms 60, 62 and bar 64 in order to enable the nozzles 54 to be raised away from contact with the conveyor belt 66. Referring to FIG. 12, the dotted line position illustrates the upward position of the nozzles 54 when in the raised position. In this position, the extruded material may be extruded into a dump bucket, until at which time the material reaches the desired consistency of flow rate. At such time, the dump bucket may be removed and the parallelogram linkage moved downwardly by grasping handle 176 and pushing downwardly until the nozzles 54 are again oriented at the desired angle to the conveyor belt as shown in FIG. 12.

Figure 13:
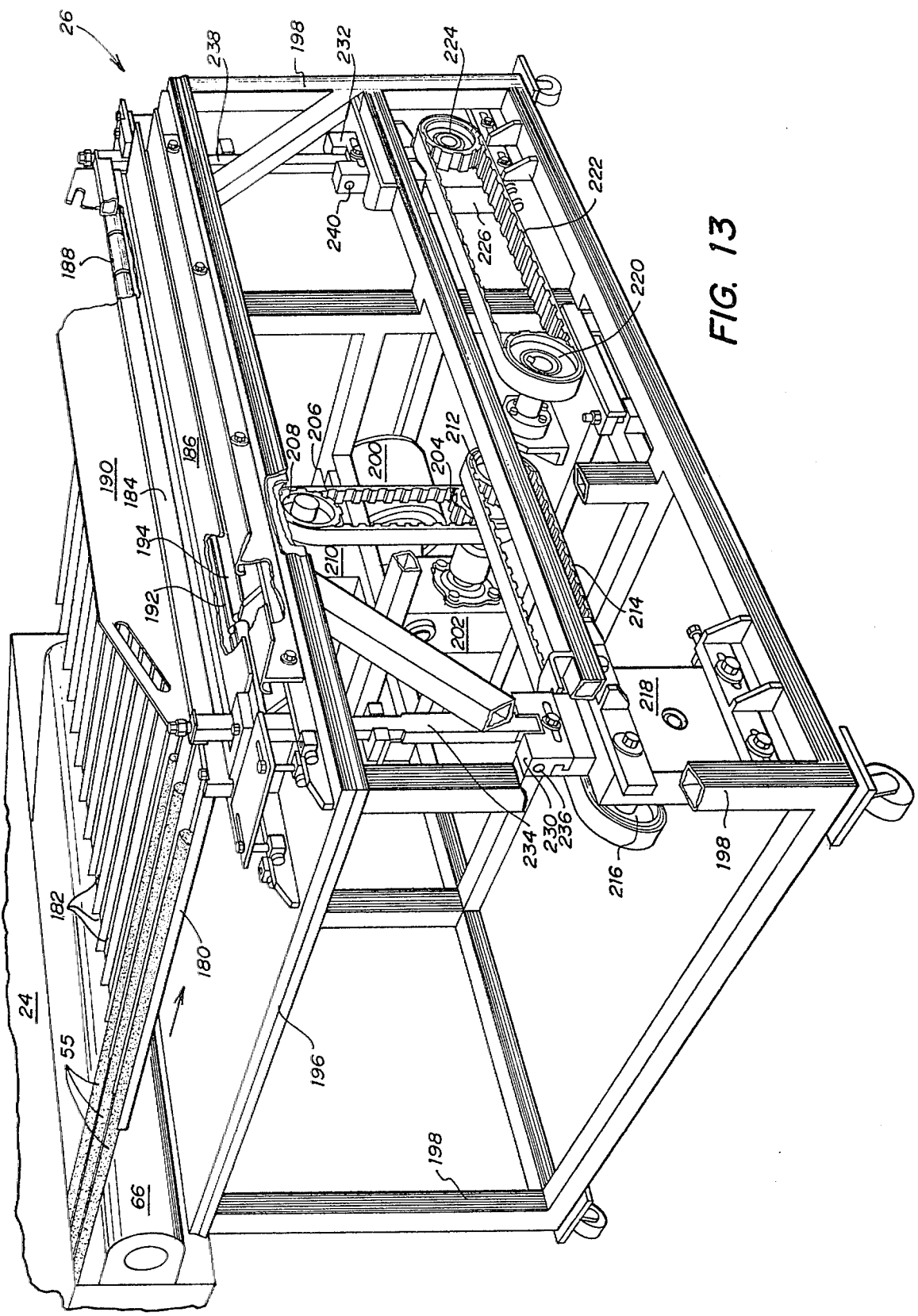
FIG. 13 is a perspective, partially broken away view of the cutting table of the invention.

Referring to FIG. 13, the cutting table 26 of the invention is illustrated in detail. As previously noted, the cutting table 26 is located at the output of the freezer 24 which delivers sixteen continuous lengths 55 of chilled pork sausage in parallel to the cutting table. In FIG. 13, only two of the lengths 55 are illustrated for clarity of illustration as being delivered by conveyor belt 66. The chilled lengths 55 are directed to a guide member 180 which includes a plurality of slots or corrugations 182 dimensioned to receive the continuous lengths. The lengths are thus guided to an elongated vertical cutting blade 184 which is reciprocated in a manner to be subsequently described in synchronism with a horizontal bed 186. A hold-down roller 188 is disposed in front of the blade 184 in order to hold the continuous lengths 55 down during the severing operation of the knife blade 184. A backboard 190 is disposed over the blade 184.

The bed 186 reciprocates in a horizontal plane over two rollers 192 and 194. The cutting assembly is mounted on a horizontal platform 196 supported by legs 198. The reciprocating movement of the knife blade 184 and the bed 186 is provided by an electrical motor 200 which operates a drive motor 202. The output shaft of motor 202 rotates a gear 204 which operates a timing belt 206. Belt 206 operates a gear 208 of a linear displacement cam 210.

The output shaft of the motor 202 also rotates a gear 212 which operates a timing belt 214. Belt 214 rotates a gear 216 attached to a second linear displacement cam 218. The output of motor 202 also rotates a gear 220 which moves a timing belt 222 which rotates a gear 224 of a third linear displacement cam 226. The three linear displacement cams 210, 218 and 226 operate in the known manner to translate rotary motion to linear motion. Suitable linear displacement cams are manufactured and sold by the Stelron Corporation.

A block 230 is mounted above the linear displacement cam 218, while a block 232 is mounted above the cam 226. A vertical post 234 is pivotally mounted at 236 to block 230. Similarly, a vertical post 238 is pivotally mounted at pivot point 240 to block 232. The tops of posts 234 and 238 are connected to the blade 184. Operation of the linear displacement cams 218 and 226 thus serve to provide vertical movement to the blade 184. Operation of the linear displacement cam 210 operates to provide horizontal reciprocational movement to the cutting blade 184 and the bed 186.

FIG. 14 illustrates a front view of the cutting assembly. The backboard 190 is shown interconnected with the cutting blade 184. Posts 238 and 234 operate to provide vertical movement to the cutting blade 184 in order to sever the continuous lengths of sausage in the manner to be subsequently described. The bed 186 rides upon rollers 192 and 194 in the manner previously described. A rod 250 includes a plurality of rollers 252 thereon in order to hold the continuous lengths down during the cutting operation.

Figure 15:
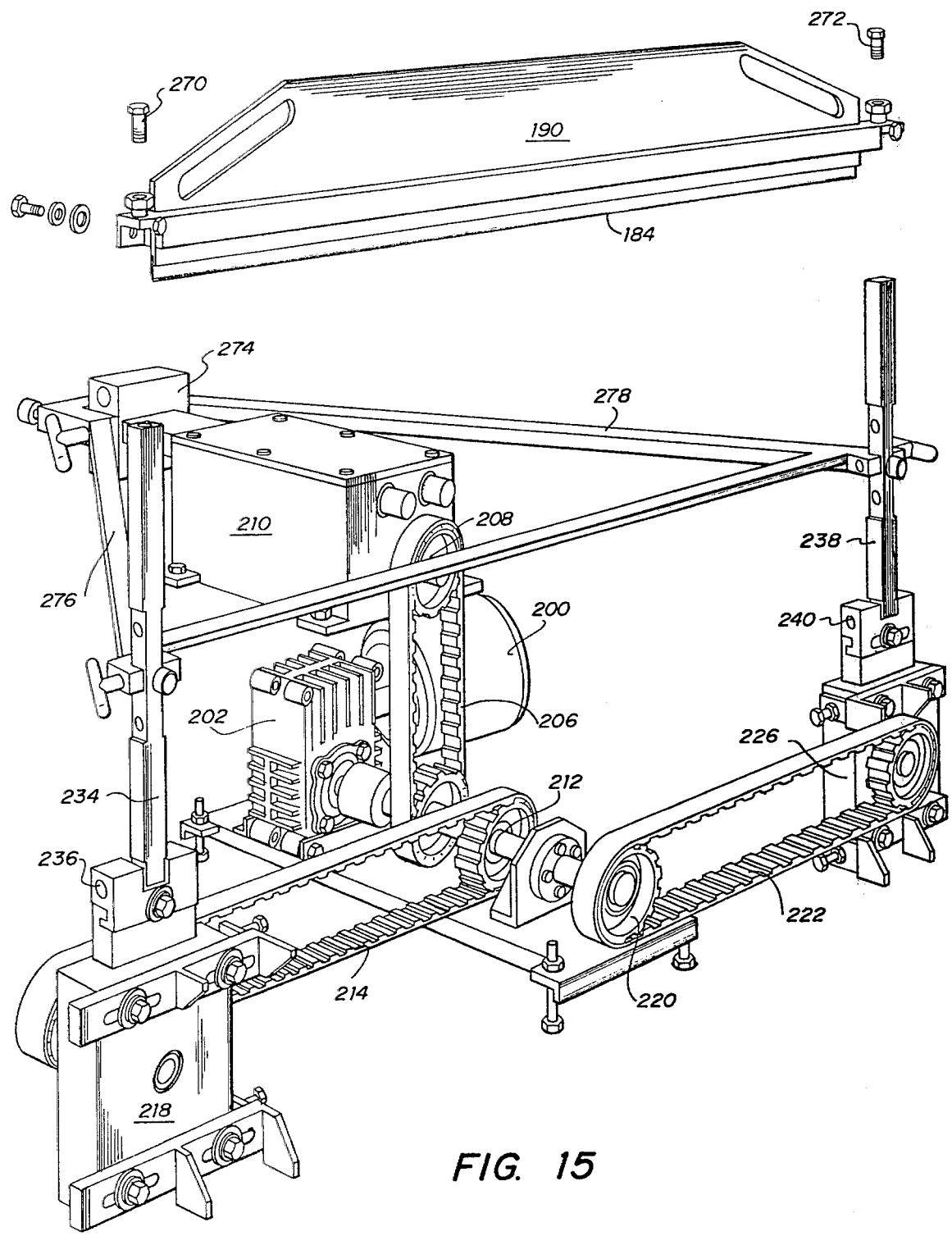
FIG. 15 is a perspective, exploded view of a portion of the cutting table shown in FIG. 13.

FIG. 15 illustrates the linear displacement cam arrangement which provides the reciprocating motion to the cutting blade 184 and the bed 186. As previously noted, the linear displacement cams 218 and 226 operate to cause reciprocating vertical motion to the posts 234 and 238. The cutting knife 184 is attached to the top of posts 234 and 238 by bolts 270 and 272 such that the cutting blade 184 is moved up and down in order to cut the continuous lengths. Inasmuch as th continuous lengths are traveling perpendicular to the orientation of the cutting blade 184, the blade 184 cuts each of the sixteen continuous lengths simultaneously.

The linear displacement cam 210 reciprocates a block 274 in a horizontal plane. Block 274 is attached by arms 276 and 278 to posts 234 and 238. Thus, arms 276 and 278 are moved horizontally, thereby causing the posts 234 and 238 to pivot about pivot points 236 and 240. The posts 234 and 238 thus swing back and forth in a limited arc in order to move the cutting blade 184 in a horizontal plane. This mechanism also causes the movement of the bed 186 on a horizontal plane.

It will be seen from FIGS. 13 and 15 that the posts 234 and 238 and the arms 276 and 278 may be selectively adjusted to any of several desired positions in order to allow the movement of the cutting blade 184 and the bed 186 to be selectively adjusted. In this manner, the length of cuts made by the cutting blade may be selectively adjusted in order to enable the weight of the final discrete product to be selectively adjusted.

Figure 16A:
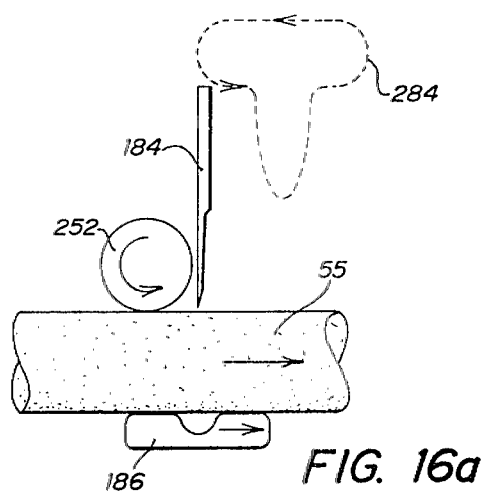
FIGS. 16a-16d illustrate the cutting operation of the blade and bed of the cutting table.

FIGS. 16a-16d illustrate the cutting operation of the blade 184 and the bed 186. Referring to FIG. 16a, the blade 184 is shown in its initial starting position just behind the roller 252 which operates to maintain the continuous length 55 against the bed 186. During operation of the device, the knife blade 184 covers a reciprocating path indicated by the dotted line 284. That is, the knife 184 moves along with the length 55 for a short distance and is then moved downwardly in order to sever the length 55. Subsequently, the knife blade 184 is moved upwardly and is then raised and moved back to the original starting position shown in FIG. 16a. Roller 252 rotates in the direction illustrated during operation of blade 184.

Figure 16B:
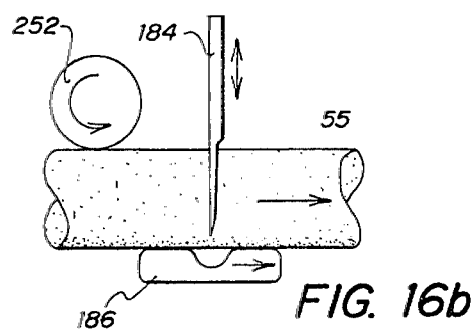

FIG. 16b illustrates how the knife blade 184 has been moved to the right in synchronism with movement of the bed 186 and then moves downwardly in order to sever the length 55. Inasmuch as the knife 184 and bed 186 are traveling at the same rate as the length 55, the length does not have to be stopped to enable severing thereof.

Figure 16C:
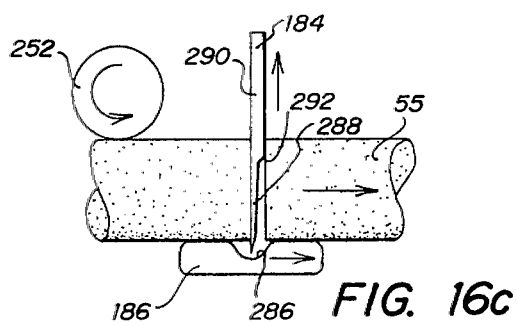

FIG. 16c illustrates the final severing of the length 55. As shown in FIG. 16c, the bed 186 includes a depression 286 which receives the foremost edge of the blade 184 in order to insure that the blade passes completely through the length 55. Moreover, FIG. 16c illustrates the particular shape of the cutting blade 184. The lowermost portion 288 of the blade is relatively narrow and is maintained with a very sharp lower point. The upper portion 290 of the blade is wider than the lower portion. The two portions are separated by a beveled portion 292. The lower portion 288 is thus utilized to make the initial cut through the length 55. The upper and wider portion 292 acts to push the severed portion of the length 55 away from the uncut portion, and thus tends to break and completely sever any fibers which would tend to prevent clean cutting.

Figure 16D:
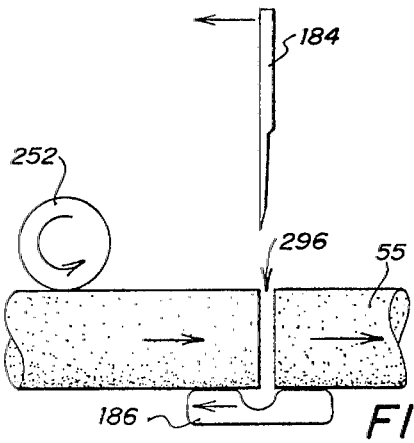

After the knife has made its downward descent as shown in FIG. 16c, the knife is raised while still traveling in the direction and at the same rate as length 55 until it reaches the position shown in FIG. 16d. At this position, the blade 184 and the bed 186 change horizontal direction and move back to the original starting point as shown in FIG. 16a. As shown by the arrow 296, the continuous length 55 has thus been severed by the cutting blade 184. The blade 184 is continuously moved in the path shown by the dotted line 284 in order to periodically cut off identical lengths of product. In this way, products of exact weight, volume and consistency may be maintained. If desired, the volume, consistency, flow rate or length of cutting path of the blade 184 may be varied in order to change the volume or weight or consistency of the final product.

Figure 17:
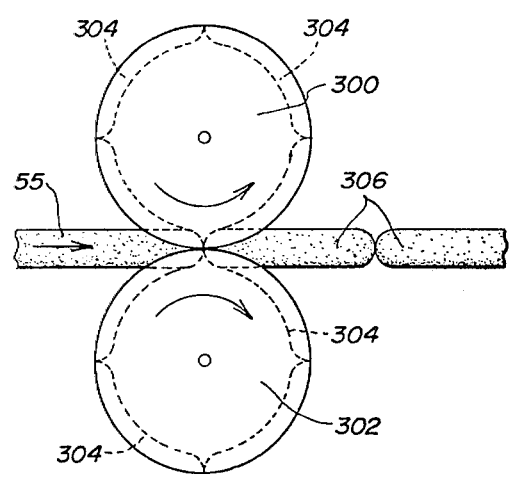
FIG. 17 is a somewhat diagrammatic view of a second embodiment of a cutting device for use with the invention.

FIG. 17 illustrates another embodiment of a severing device for use with the present invention. In this embodiment, a pair of cylindrical wheels 300 and 302 are mounted on opposite sides of the continuous length 55 to be severed. Each of the wheels 300 and 302 include depressions 304 about the periphery thereof. Cavities 304 are provided with the desired shape of the resulting link sausage and the cavities in the opposed wheels are mated so as to produce link sausage as illustrated by the links 306. The wheels 300 and 302 are driven in synchronism in opposite directions in order to form the links 306 as desired.

Figure 18:
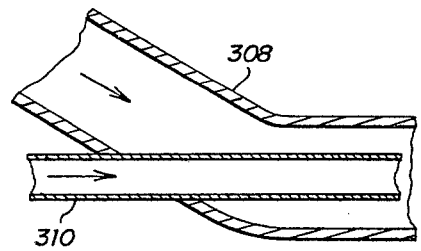
FIG. 18 is a somewhat diagrammatic illustration of a manifold outlet for providing dual ingredient extrusions.

FIG. 18 illustrates a variation of the extruding manifold of the present invention, wherein two or more products may be extruded. For clarity of illustration, only single outlets of two extruding manifolds are illustrated. The first outlet 308 is analogous to an outlet 40 of the extruding manifold 20 previously described. In addition, a second outlet 310 may extend from a second extruding manifold. A first ingredient may be extruded through the outlet 308, with a second and different ingredient extruded through outlet 310. Outlet 310 is centered within the outlet 308, such that an extruded product will have two distinct areas of different ingredients. Extruded ingredients may then be transported through a chilling station in the manner previously described and then severed in order to form discrete products.

Figure 19:
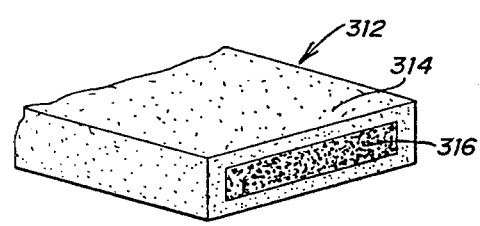
FIG. 19 is a perspective view of a discrete dual ingredient product having a rectangular cross-section.

FIG. 19 illustrates a product 312 formed from a dual extrusion apparatus shown in FIG. 18. The product 312 may comprise a first outer ingredient 314 and an inner ingredient 316 which were extruded through manifold outlets having square rectangular cross-sections.

Figure 20:
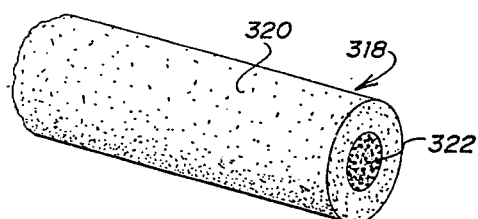
FIG. 20 is a perspective view of a dual ingredient product having a circular cross-section.

FIG. 20 illustrates a product 318 which includes an outer ingredient 320 and an inner ingredient 322. Product 318 may be extruded through manifold outlets having circular cross-sections.

It will be understood that a wide variety of dual ingredient products may be formed with the outlets shown in FIG. 18. For example, the product of FIG. 19 could include a first ingredient 316 of a meat such as ham with an outer ingredient 314 comprising an egg product. Alternatively, the ingredient 316 could comprise a meat and the outer ingredient 314 could comprise a dough product to form a tamale or the like.

Figure 21:
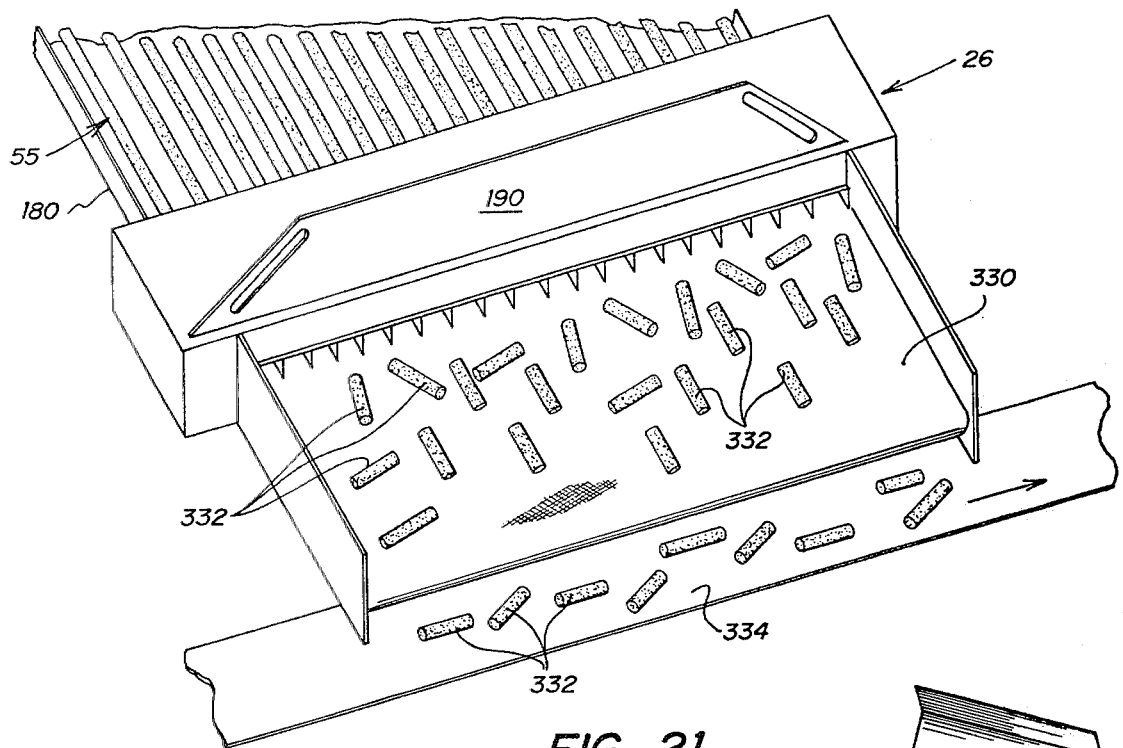
FIG. 21 is a perspective view of the outlet of the cutting table.

FIG. 21 illustrates the output of the cutting table 26 which operates in the manner previously described. A downwardly sloping dispensing surface 330 extends from the output of the cutting station 26 and a plurality of discrete sausage lengths 332 may be seen to be dispensed from the cutting table 26. The products 332 roll and slide downwardly to a conveyor 334 whereupon products are conveyed to a loading station 28.

Figure 22:
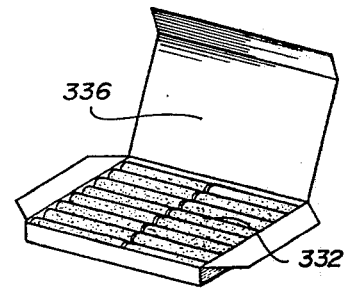
FIG. 22 is a perspective view of a package including a plurality of discrete pork sausages formed by the present invention.

As previously noted, a particular advantage to the present invention is that very accurate portion control may be provided for the present invention. Thus, each of the products 332 may be formed with the same volume and size and weight so that a plurality of the products may fit within a carton 336 as shown in FIG. 22. For example, each of the products 332 may be cut to weigh one-ounce, and thus sixteen one-ounce products may be packaged within package 336 to provide a one-pound package. With the use of the present invention, a very accurate weight is maintained with each product. However, if the weight is desired to be changed, the system may be easily varied to change the weight. The product 332 is already frozen when placed in the package 336, and so additional hard freezing of the package 336 is not required after packing.

Figure 23:
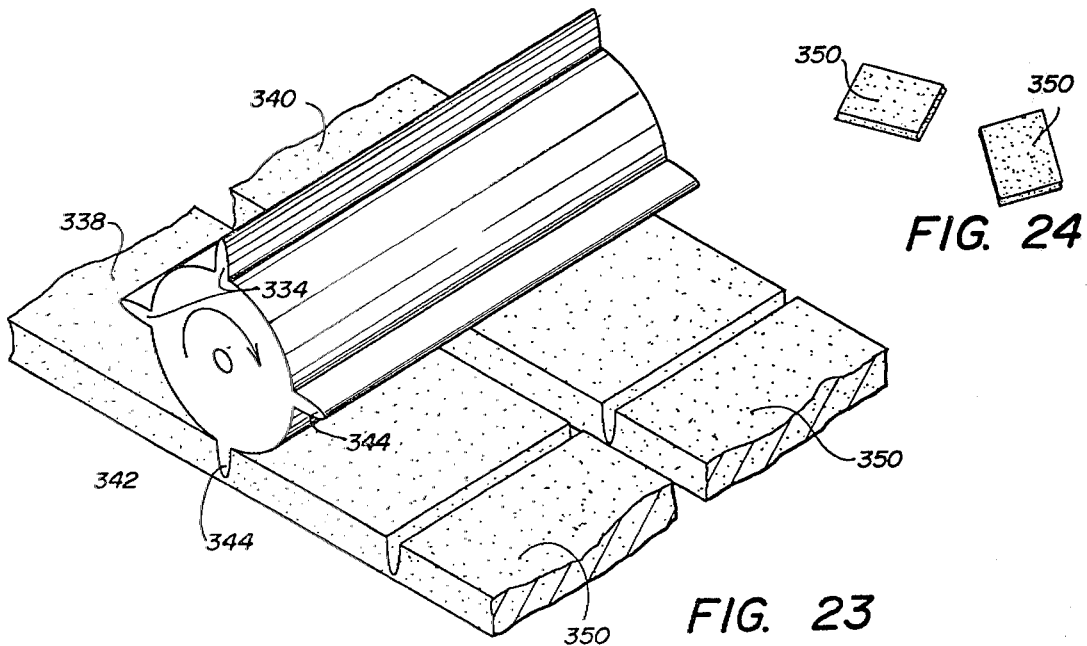
FIG. 23 is a perspective view of a third embodiment of a cutting device for use with the present invention to form rectangular sausage products.
Figure 24:
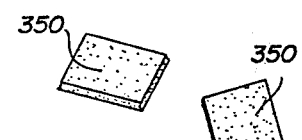
FIG. 24 is a perspective view of a plurality of rectangular pork sausages formed in accordance with the invention.

FIG. 23 illustrates another embodiment of the severing device for use with continuous lengths of sausage having generally rectangular cross-sections. Continuous lengths 338 and 340 are illustrated as having been extruded by nozzles with rectangular cross-sections and then chilled as previously described. The lengths are applied through a cutting station which includes a rotating wheel 342 having four cutting edges 344 equally spaced thereabout. Rotation of the wheel 342 thus causes periodic cuts to be made across the lengths 338 and 340 to form a plurality of rectangular products 350 each having the same size and weight. FIG. 24 illustrates two examples of rectangular chilled pork sausage made with the present invention and utilizing the cutter shown in FIG. 23. The rectangular sausage product 350 may be easily packaged in a rectangular package to provide a uniquely shaped sausage product.

As previously mentioned, although the present invention has been described with respect to preparing chilled pork sausage, it will be understood that the present apparatus and method may be utilized to produce a wide variety of products when it is desired to form a plurality of discrete products having the same weight, size and characteristics from a semi-fluid material.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. The method of producing discrete food products having a selected weight comprising:
   forming a semi-fluid mixture of the product,
   pumping said mixture to an extrusion location,
   sensing the flow of fluid pumped to the extrusion location,
   controlling the pumping of the fluid in response to the flow to provide a uniform flow to the extrusion location,
   extruding said mixture into and through a pluraltiy of nozzles onto a moving conveyor, thereby forming the mixture into a plurality of elongated continuous lengths having a preselected substantially cylindrical uniform cross section along the length thereof,
   metering the flow from the extrusion location to provide a uniform flow of semi-fluid from the extrusion location,
   directing said continuous length of said semi-fluid mixture through a chilling location to chill and firm the preselected cross-sectional shape of said lengths until said lengths maintain their cross-sectional shape without support,
   supporting said uniform cross-section after extrusion from said nozzles and during passage through said chilling location by the use of a structure connected to said conveyor which conforms to the shape of the bottom and at least a portion of the sides of the uniform cross-section of said extruded mixture, said structure extending along a length of and moving with said cross-section to maintain said cross-section until said mixture is firmed by chilling, and
   dividing said lengths at periodic intervals to form a plurality of products having the same selected weight.

2. The method of claim 1 and further comprising: varying the pumping of said mixture to vary the weight of said discrete products.

3. The method of claim 1 and further comprising: varying the speed of passage of said continuous length through said chilling location to vary the weight of said discrete products.

4. The method of claim 1 and further comprising: varying the periodic intervals of dividing said continuous length in order to vary the weight of said discrete products.

5. A process for producing skinless pork sausage comprising:
   boning warm pre-rigor pork,
   comminuting the bond pork to form a semi-fluid mixture,
   pumping the semi-fluid mixture to an extrusion location,
   extruding the semi-fluid mixture into and through a plurality of nozzles, thereby forming said mixture into a plurality of parallel continuous lengths having uniform nonrectangular cross-sections along the length thereof,
   chilling said extruded continuous lengths until said lengths maintain their cross-sectional configuration,
   providing a support for each of the plurality of parallel continuous lengths which conforms to the shape of the bottom and at least a portion of the sides of the uniform cross-section, said support extending along a length of and moving with the continuous lengths to support the cross-sectional shape of said continuous lengths after extrusion until said continuous lengths are sufficiently chilled to maintain their cross-sectional shape without support, and periodically severing said lengths to form a plurality of chilled discrete sausage portions without casing and having the same weight and consistency.

6. The process of claim 5 and further comprising: accumulating a prescribed number of said discrete products and packaging said number of products in a single package.

7. The process of claim 5 wherein said continuous lengths are extruded with a circular cross-section and said discrete products are cut with the same length.

8. The process of claim 5 and further comprising: metering each of said parallel continuous lengths to have the same flow rate.

9. The process of claim 5 wherein the step of chilling comprises: disposing each of said continuous lengths simultaneously on a conveyor surface moving through a chilling zone at the same rate as the rate of said extrusion of said continuous lengths.

10. The process of claim 5 wherein said extrusion occurs within four hours of slaughter of the swine used to obtain the pork to provide pork sausage which is soft and fluent.

11. The process of claim 5 and further comprising: maintaining the pre-rigor pork at a temperature of at least 80° F. during extrusion.

12. The process of claim 5 wherein said parallel lengths have circular cross-sections and wherein said step of severing forms a plurality of discrete cylindrical sausages.

13. The process of claim 5 wherein said parallel lengths have rectangular cross-sections and wherein said step of severing forms a plurality of discrete rectangular sausages.

* * * * *